US012510237B1

(12) United States Patent
Xu et al.

(10) Patent No.: US 12,510,237 B1
(45) Date of Patent: *Dec. 30, 2025

(54) LED LAMP

(71) Applicant: SHENZHEN SNC OPTO ELECTRONIC CO., LTD., Guangdong (CN)

(72) Inventors: Jianyong Xu, Guangdong (CN); Zhiping Ma, Guangdong (CN); Renyan Luo, Guangdong (CN); Qun Luo, Guangdong (CN)

(73) Assignee: SHENZHEN SNC OPTO ELECTRONIC CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 19/051,151

(22) Filed: Feb. 11, 2025

(30) Foreign Application Priority Data

Aug. 21, 2024 (CN) ........................ 202411147479.1

(51) Int. Cl.

| | |
|---|---|
| ***F21V 21/30*** | (2006.01) |
| ***F21V 23/00*** | (2015.01) |
| ***F21V 23/04*** | (2006.01) |
| ***F21V 29/70*** | (2015.01) |
| ***F21V 31/00*** | (2006.01) |
| ***F21Y 115/10*** | (2016.01) |

(52) U.S. Cl.

CPC ............ *F21V 21/30* (2013.01); *F21V 23/003* (2013.01); *F21V 23/04* (2013.01); *F21V 29/70* (2015.01); *F21V 31/005* (2013.01); *F21Y 2115/10* (2016.08)

(58) Field of Classification Search

CPC ......... F21V 21/26-30; F21V 23/00-06; F21V 29/70-83; F21V 31/00-005; F21Y 2115/10

See application file for complete search history.

(56) References Cited

U.S. PATENT DOCUMENTS 8,915,616 B2 * 12/2014 Jeon ........................ F21V 31/03
362/249.02
2021/0112647 A1 * 4/2021 Coleman ................ F21V 14/02

* cited by examiner

*Primary Examiner* — Jason M Han

(57) ABSTRACT

An LED lamp includes a heat dissipation base including a lamp panel mounting portion and a power supply mounting portion connected to an end of the lamp panel mounting portion, the lamp panel mounting portion being provided with a mounting groove; an LED lamp panel fixedly mounted in the mounting groove and including a plurality of light emitting elements; a driving power supply mounted to the power supply mounting portion; a lens plate covering the LED lamp panel; a mounting bracket connected to the power supply mounting portion and configured to drive the power supply mounting portion to rotate; and a controlling device provided on the power supply mounting portion and configured to control each light emitting element corresponding different positions of the lens plate to emit light and adjust brightness of each light emitting element corresponding to different positions of the lens plate.

13 Claims, 12 Drawing Sheets

LED LAMP

CROSS-REFERENCE TO RELATED APPLICATIONS

This application claims priority of Chinese Patent Application No. 2024111474791, filed on Aug. 21, 2024, entitled "INTELLIGENT ADJUSTABLE LED LAMP", the entire content of which is incorporated herein by reference in its entirety.

TECHNICAL FIELD

The present disclosure relates to lighting devices, and in particular to an LED lamp.

BACKGROUND

LED lamps have many advantages such as energy saving, environmental protection, long life, and have been widely used in various lighting places. The existing LED lamp is generally provided with a lens panel, but a position of the lens panel of the existing LED lamp is fixed, and the position of the lens panel cannot be flexibly adjusted according to requirements of different use places, so that a light distribution direction of the LED lamp cannot be adjusted. In addition, with the progress of society, the development of science and technology, and the rapid rise of internet technology, the demand of people begins to change, and technological and intelligent products continue to appear in all aspects of people's lives. In the aspect of lighting, intelligent lighting can achieve the purpose of safety, energy saving, comfort and efficiency, and is more intelligent and humanized. Therefore, it is necessary to improve a structure of the LED lamp.

SUMMARY

According to various embodiments, an LED lamp is provided.

An LED lamp includes:

- a heat dissipation base including a lamp panel mounting portion and a power supply mounting portion connected to an end of the lamp panel mounting portion, the lamp panel mounting portion being provided with a mounting groove;
- an LED lamp panel fixedly mounted in the mounting groove and including a plurality of light emitting elements;
- a driving power supply mounted to the power supply mounting portion;
- a lens plate covering the LED lamp panel;
- a mounting bracket connected to the power supply mounting portion and configured to drive the power supply mounting portion to rotate; and
- a controlling device provided on the power supply mounting portion and electrically connected between the LED lamp panel and the driving power supply, wherein the controlling device is configured to control each light emitting element corresponding to different positions of the lens plate to emit light and adjust brightness of each light emitting element corresponding to different positions of the lens plate.

In one of the embodiments, the mounting bracket includes a first support and a second support, the first support is configured to be fixed to a fixing object, the second support is connected to the power supply mounting portion and is provided with a circular gear groove, an inner wall of the gear groove is provided with teeth, the LED lamp further comprises a driving motor mounted on the first support, a motor shaft of the driving motor is provided with a gear engaged with the teeth.

In one of the embodiments, the second support is capable of rotating 180 degrees relative to the first support.

In one of the embodiments, the plurality of light emitting elements includes at least two groups of light emitting elements arranged in a matrix, each group of the light emitting elements includes a first lamp bead, a second lamp bead, a third lamp bead, a fourth lamp bead, a fifth lamp bead, a sixth lamp bead, a seventh lamp bead, and an eighth lamp bead; a distance between the first lamp bead and the second lamp bead, a distance between the third lamp bead and the fourth lamp bead, a distance between the fifth lamp bead and the sixth lamp bead, and a distance between the seventh lamp bead and the eighth lamp bead each ranges from 0.8 mm to 1.2 mm.

In one of the embodiments, the controlling device includes a first angle controller, the first angle controller includes a power supply circuit, a Bluetooth circuit, an adjustment control circuit, and a plurality of relays, the power supply circuit is electrically connected to the Bluetooth circuit and the adjustment control circuit to supply power to the Bluetooth circuit and the adjustment control circuit, the Bluetooth circuit is configured to receive a light emitting angle control signal sent by an external electronic device and transmit the light emitting angle control signal to the adjustment control circuit, the plurality of relays are electrically connected to the driving power supply and the LED lamp panel, the adjustment control circuit is configured to control the corresponding relay to turn on or off according to different light emitting angle control signals to control the driving power supply to supply power to different light emitting elements, so as to control the first lamp bead, the second lamp bead, the third lamp bead, the fourth lamp bead, the fifth lamp bead, the sixth lamp bead, the seventh lamp bead, and the eighth lamp bead to emit light, respectively.

In one of the embodiments, in response to receiving a first light emitting angle control signal by the Bluetooth circuit, the first lamp bead and the third lamp bead emit light, and the second lamp bead, the fourth lamp bead, the fifth lamp bead, the sixth lamp bead, the seventh lamp bead, and the eighth lamp bead do not emit light;

- in response to receiving a second light emitting angle control signal by the Bluetooth circuit, the first lamp bead, the second lamp bead, the third lamp bead, and the fourth lamp bead emit light, and the fifth lamp bead, the sixth lamp bead, the seventh lamp bead, and the eighth lamp bead do not emit light;
- in response to receiving a third light emitting angle control signal by the Bluetooth circuit, the second lamp bead and the fourth lamp bead emit light, and the first lamp bead, the third lamp bead, the fifth lamp bead, the sixth lamp bead, the seventh lamp bead, and the eighth lamp bead do not emit light;
- in response to receiving a fourth light emitting angle control signal by the Bluetooth circuit, the fifth lamp bead, the sixth lamp bead, the seventh lamp bead, and the eighth lamp bead emit light, and the first lamp bead, the second lamp bead, the third lamp bead, and the fourth lamp bead do not emit light.

In one of the embodiments, the controlling device further includes a second angle controller, the second angle controller includes a switch base, a first electronic switch, and a first toggle, the switch base is fixed to the power supply mounting portion, the first electronic switch is fixedly mounted on the switch base, both ends of the first electronic switch are electrically connected to the driving power supply and the LED lamp panel, respectively, the first toggle is connected to the first electronic switch and is configured to be toggled to change a state of the first electronic switch, and the first electronic switch is configured to control the first lamp bead, the second lamp bead, the third lamp bead, the fourth lamp bead, the fifth lamp bead, the sixth lamp bead, the seventh lamp bead, and the eighth lamp bead to emit light according to different states thereof.

In one of the embodiments, in response to the first electronic switch being in a first state, the first lamp bead and the third lamp bead emit light, and the second lamp bead, the fourth lamp bead, the fifth lamp bead, the sixth lamp bead, the seventh lamp bead, and the eighth lamp bead do not emit light;

- in response to the first electronic switch being a second state, the first lamp bead, the second lamp bead, the third lamp bead, and the fourth lamp bead emit light, and the fifth lamp bead, the sixth lamp bead, the seventh lamp bead, and the eighth lamp bead do not emit light;
- in response to the first electronic switch being a third state, the second lamp bead and the fourth lamp bead emit light, and the first lamp bead, the third lamp bead, the fifth lamp bead, the sixth lamp bead, the seventh lamp bead, and the eighth lamp bead do not emit light;
- in response to the first electronic switch being a fourth state, the fifth lamp bead, the sixth lamp bead, the seventh lamp bead, and the eighth lamp bead emit light, and the first lamp bead, the second lamp bead, the third lamp bead, and the fourth lamp bead do not emit light.

In one of the embodiments, the controlling device further includes a color temperature controller, and the color temperature controller is configured to adjust the brightness of each light emitting element corresponding to different positions of the lens plate.

In one of the embodiments, the color temperature controller includes the switch base, a second electronic switch, and a second toggle, the second electronic switch is fixedly mounted on the switch base, both ends of the second electronic switch are electrically connected to the driving power supply and the LED lamp panel, respectively, the second toggle is connected to the second electronic switch and is configured to be toggled to change a state of the second electronic switch, and the second electronic switch is configured to control the brightness of the first lamp bead, the second lamp bead, the third lamp bead, the fourth lamp bead, the fifth lamp bead, the sixth lamp bead, the seventh lamp bead, and the eighth lamp bead according to different states thereof.

In one of the embodiments, the lens plate includes a lens frame and a plurality of lenses protruding from the lens frame, the plurality of lenses correspond to the plurality of light emitting elements and are convex in a direction away from the light emitting elements, the lens frame is provided with a plurality of receiving holes corresponding to the plurality of lenses, the plurality of light emitting elements are received in the plurality of receiving holes and face the plurality of lenses, the plurality of receiving holes include a first receiving hole and a second receiving hole that are substantially elliptical, and a third receiving hole and a fourth receiving hole that are substantially square.

In one of the embodiments, the LED lamp further includes a first sealing ring provided between the lens plate and the LED lamp panel.

In one of the embodiments, the power supply mounting portion includes a power supply accommodating chamber and a power supply cover, the driving power supply is mounted in the power supply accommodating chamber, the power supply cover covers the power supply accommodating chamber, one end of the power supply cover is hinged to the heat dissipation base, and another end of the power supply cover is detachably connected to the heat dissipation base by screws.

In one of the embodiments, the LED lamp further includes a second sealing ring and a mounting bracket, wherein the second sealing ring is provided between the power supply mounting portion and the power supply cover.

The details of one or more embodiments of the application are set forth in the accompanying drawings and the description below. Other features, objects, and advantages of the application will be apparent from the description and drawings, and from the claims.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

REFERENCE NUMERALS

Figure 1:
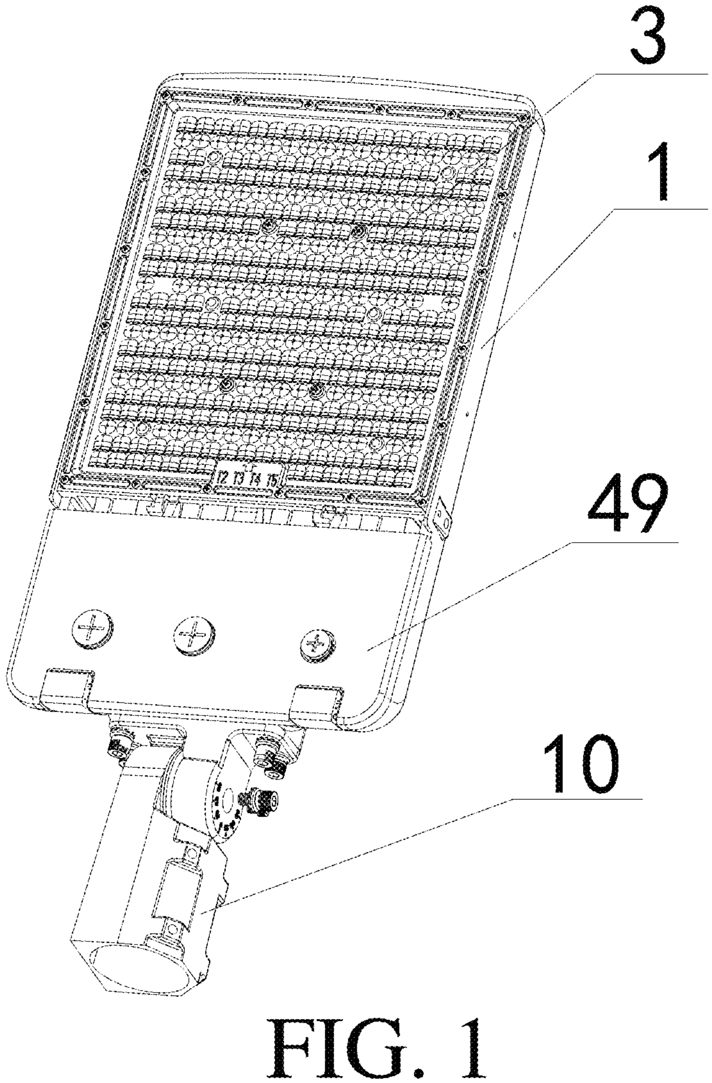
FIG. 1 is a perspective view of an LED lamp according to an embodiment.
Figure 2:
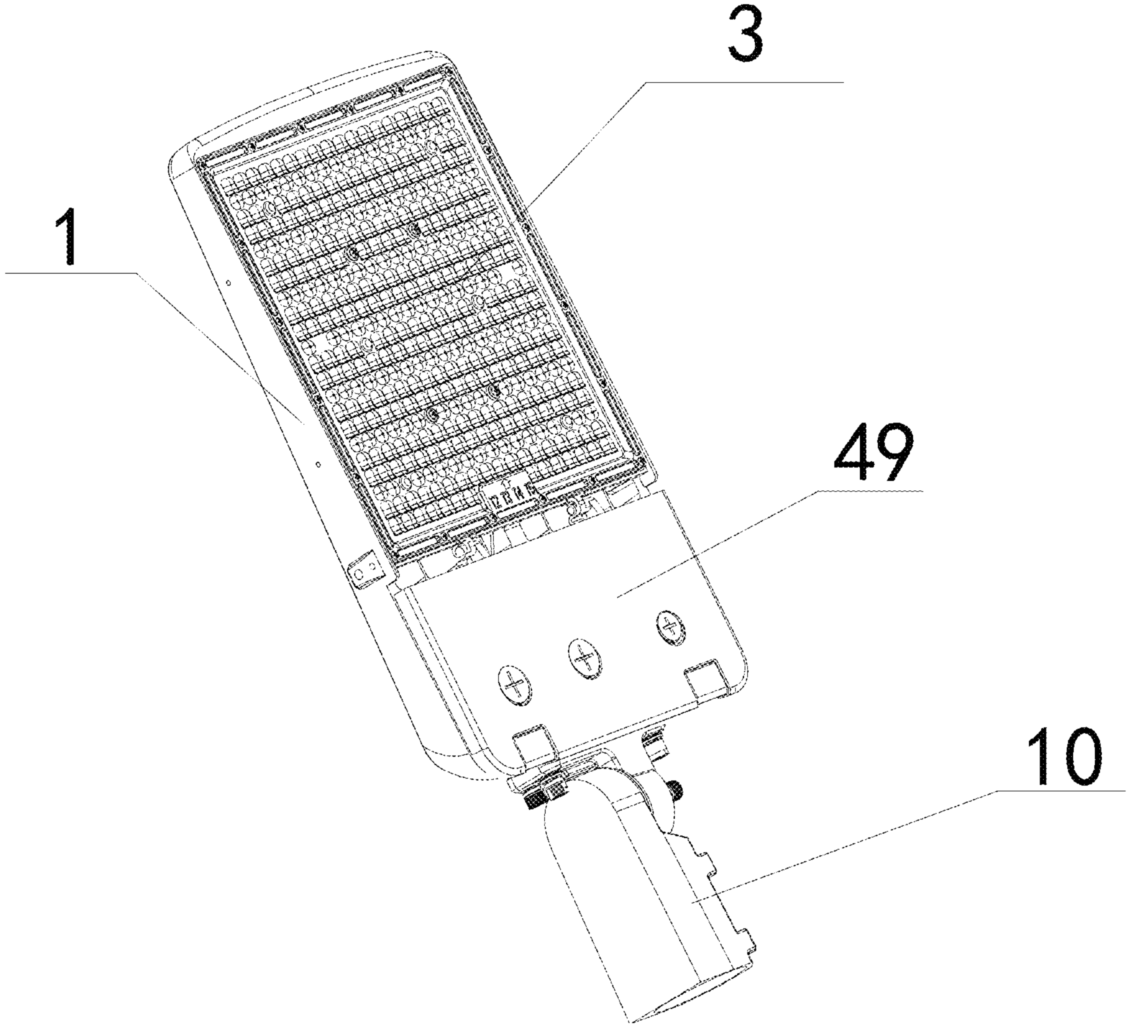
FIG. 2 is a perspective view of the LED lamp of FIG. 1 viewed from another aspect.

1, heat dissipation base; 2, LED lamp panel; 3, lens plate; 4, driving power supply; 5, lamp panel mounting portion; 6, power supply mounting portion; 7, mounting groove; 8, light emitting element; 9, controlling device; 10, mounting bracket; 11, first support; 12, second support; 13, gear groove; 14, teeth; 15, driving motor; 16, gear; 17, first lamp bead; 18, second lamp bead; 19, third lamp bead; 20, fourth lamp bead; 21, fifth lamp bead; 22, sixth lamp bead; 23, seventh lamp bead; 24, eighth lamp bead; 25, lens frame; 26, first lens portion; 27, second lens portion; 28, third lens portion; 29, fourth lens portion; 30, first receiving hole; 31, second receiving hole; 32, third receiving hole; 33, fourth receiving hole; 9*a*, first angle controller; 34, power supply circuit; 35, Bluetooth circuit; 36, adjustment control circuit; 37, relay; 38, external electronic device; 39, housing; 9*b*, second angle controller; 40, switch base; 41, first electronic switch; 42, first toggle; 43, color temperature controller; 44, second electronic switch; 45, second toggle; 46, switch box; 47, first sealing ring; 48, power supply accommodating chamber; 49, power supply cover; 50, second sealing ring.

DETAILED DESCRIPTION OF THE EMBODIMENTS

The technical solution in the embodiment of the present disclosure will be clearly and completely described below in conjunction with the drawings in the embodiment of the application. Apparently, the described embodiments are only some of the embodiments of the application, not all of them. Based on the embodiments in the present disclosure, all other embodiments obtained by a person skilled in the art without making creative efforts shall all fall within the protection scope of the present disclosure.

In the drawings of the embodiments of the present disclosure, the same or similar numbers correspond to the same or similar components. In the description of the present disclosure, it should be understood that terms "upper", "lower", "front" and "rear", "left", "right", "vertical", "horizontal", "lateral", "longitudinal", "top", "bottom", "inner", "outer", and other indicated orientation or positional relationships are based on the orientation or positional relationship shown in the drawings for convenience and simplicity of description of the present disclosure only, and not as an indication or implication that the devices or elements referred to must have or be constructed or operated in a specific orientation. Therefore, the terms describing positional relationships in the drawings are only for illustrative purposes and should not be construed as limitations of the present disclosure.

Referring to FIGS. 1 to 4, an LED lamp according to an embodiment is provided, including a heat dissipation base 1, an LED lamp panel 2, a lens plate 3, a driving power supply 4, a mounting bracket 10, and a controlling device 9. The heat dissipation base 1 includes a lamp panel mounting portion 5 and a power supply mounting portion 6 connected to an end of the lamp panel mounting portion 5. The driving power supply 4 is mounted to the power supply mounting portion 6 and is electrically connected to the LED lamp panel 2 to power the LED lamp panel 2. The lamp panel mounting portion 5 is provided with a mounting groove 7. The LED lamp panel 2 is fixedly mounted in the mounting groove 7 and includes a plurality of light emitting elements 8. The lens plate 3 covers the LED lamp panel 2. The mounting bracket 10 is connected to the power supply mounting portion 6, and the mounting bracket 10 is configured to support the power supply mounting portion 6 and drive the power supply mounting portion 6 to rotate. The controlling device 9 is electrically connected between the LED lamp panel 2 and the driving power supply 4. The controlling device 9 is provided on the power supply mounting portion 6. The controlling device 9 is configured to control each light emitting element 8 corresponding to different positions of the lens plate 3 to emit light and adjust brightness of each light emitting element 8 corresponding to different positions of the lens plate 3.

By providing the above-mentioned controlling device 9, when a light emitting angle of the LED lamp needs to be adjusted, it is only required to control the light emitting elements 8 corresponding to different positions of the lens plate 3 to emit light through the controlling device 9. When a color temperature of the LED lamp needs to be adjusted, it is only required to control the brightness of the light emitting elements 8 corresponding to different positions of the lens plate 3 through the controlling device 9.

Figure 5:
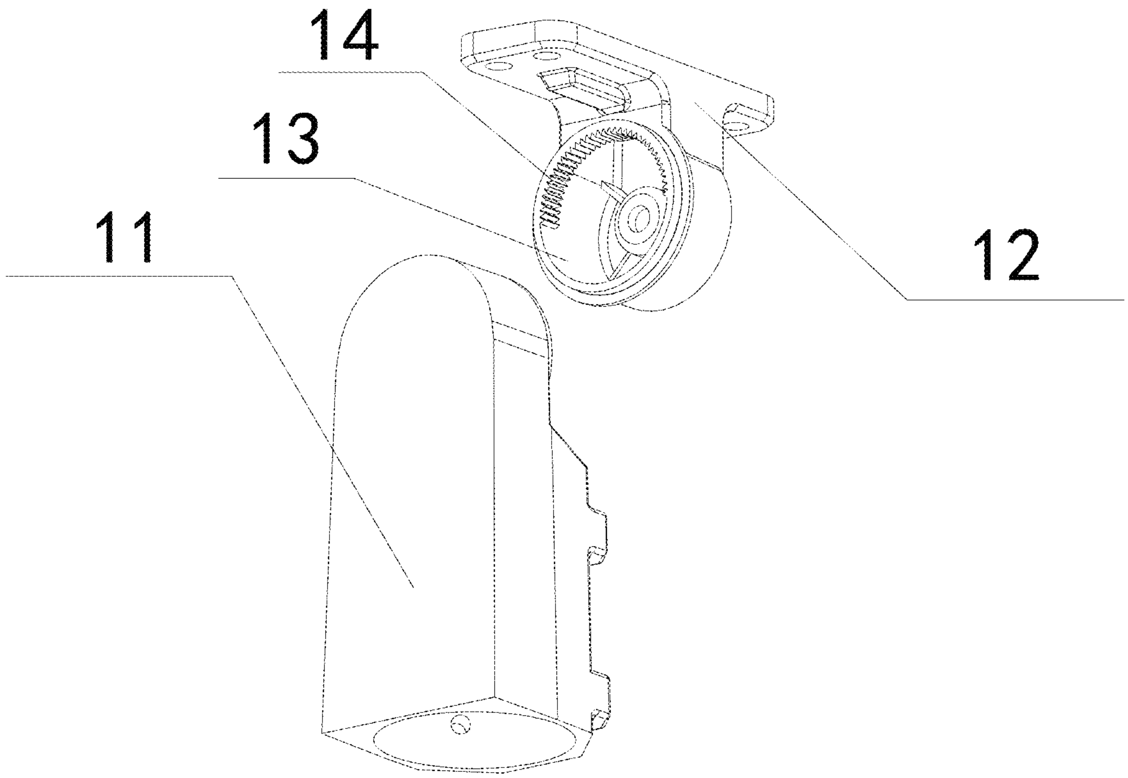
FIG. 5 is an exploded view of a mounting bracket of the LED lamp shown in FIG. 1.
Figure 6:
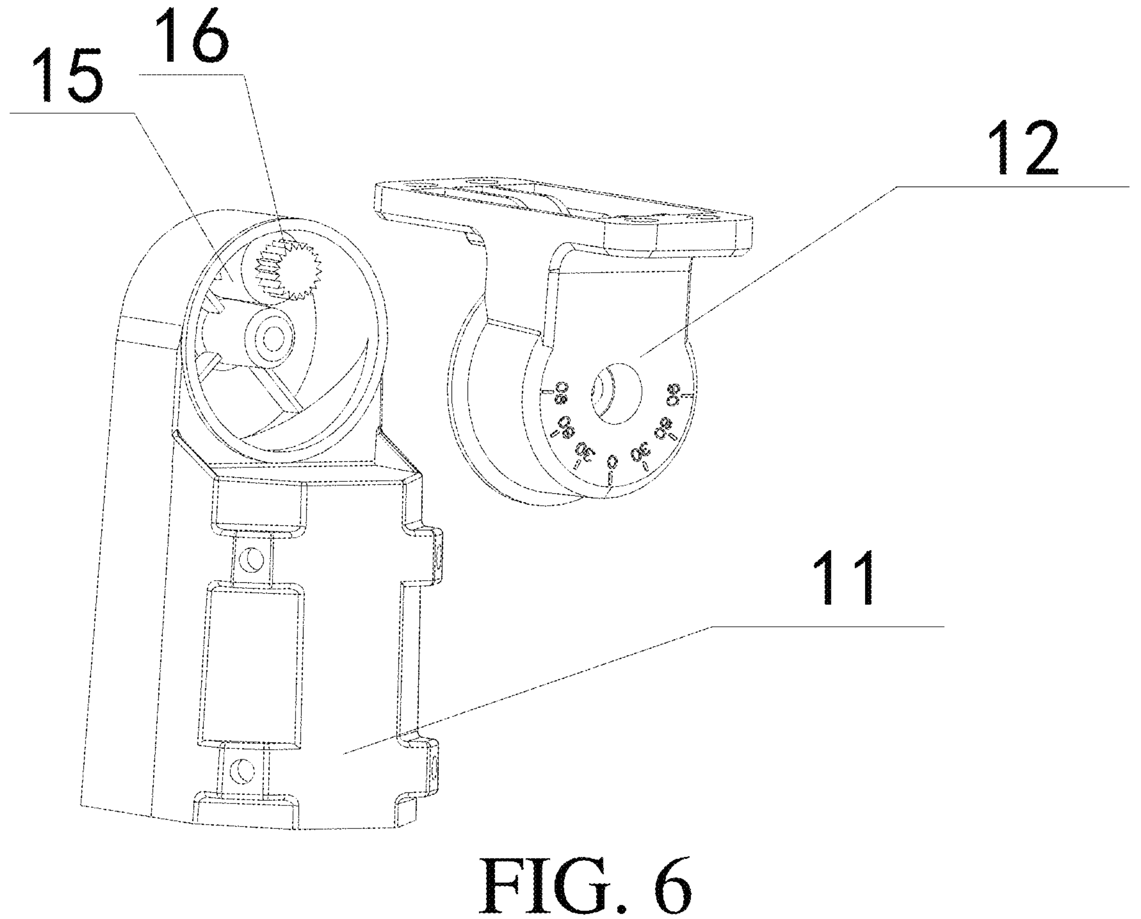
FIG. 6 is another exploded view of the mounting bracket.
Figure 7:
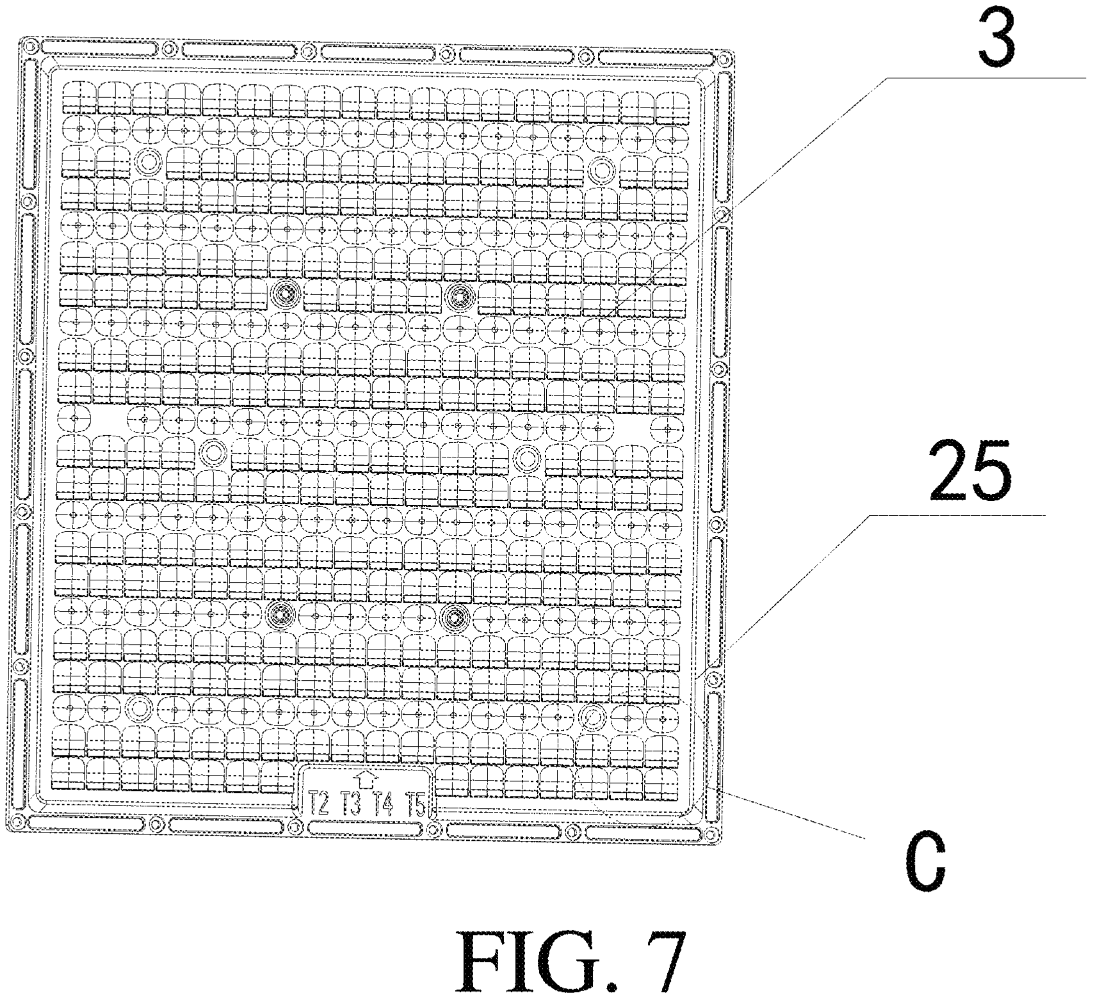
FIG. 7 is a front view of a lens plate of the LED lamp shown in FIG. 1.
Figure 8:
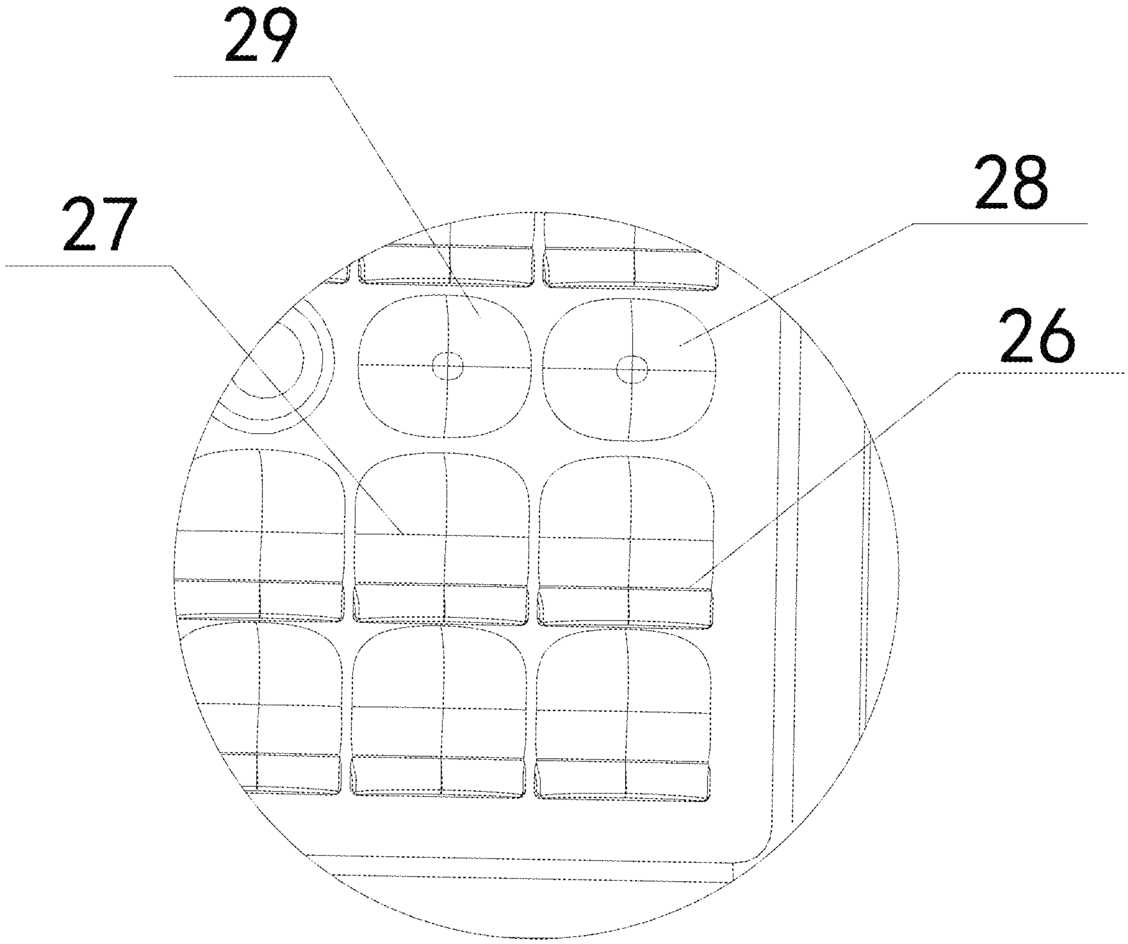
FIG. 8 is an enlarged view of a portion C of FIG. 7.
Figure 9:
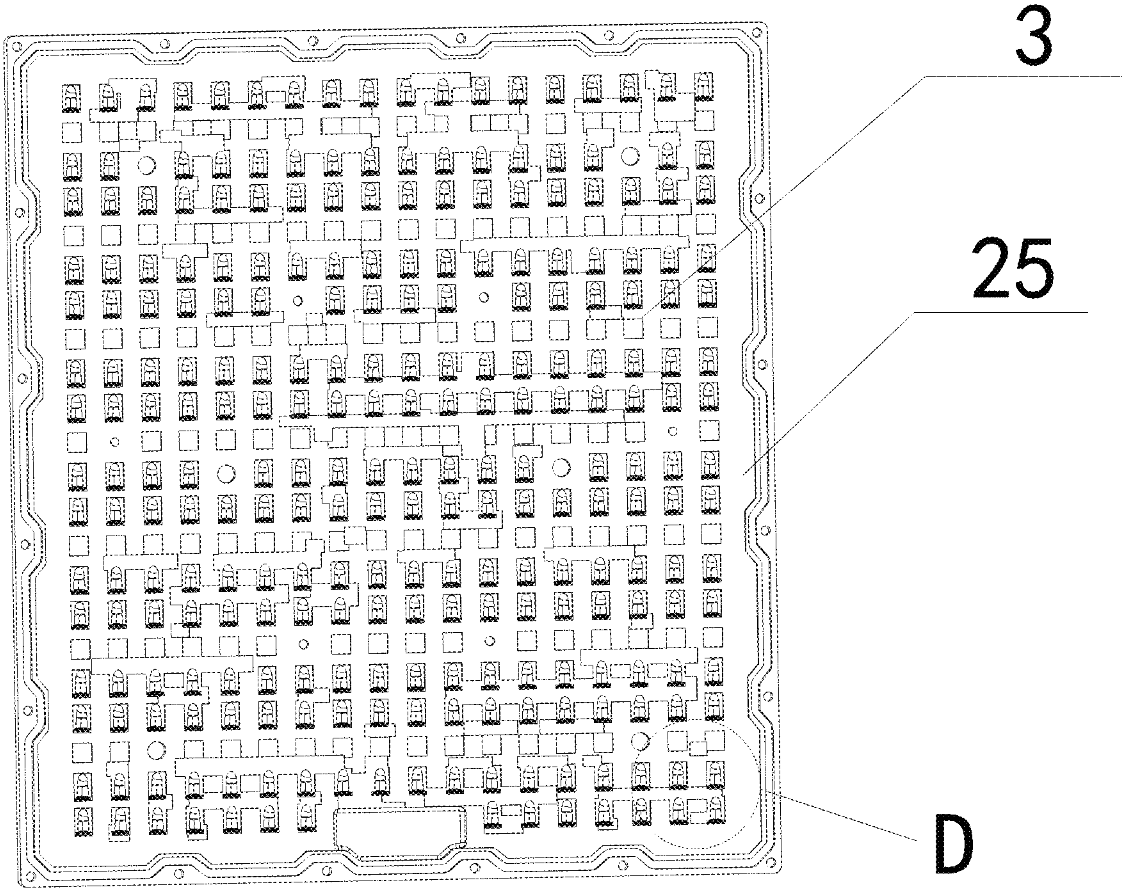
FIG. 9 is a rear view of the lens plate of the LED lamp shown in FIG. 1.
Figure 10:
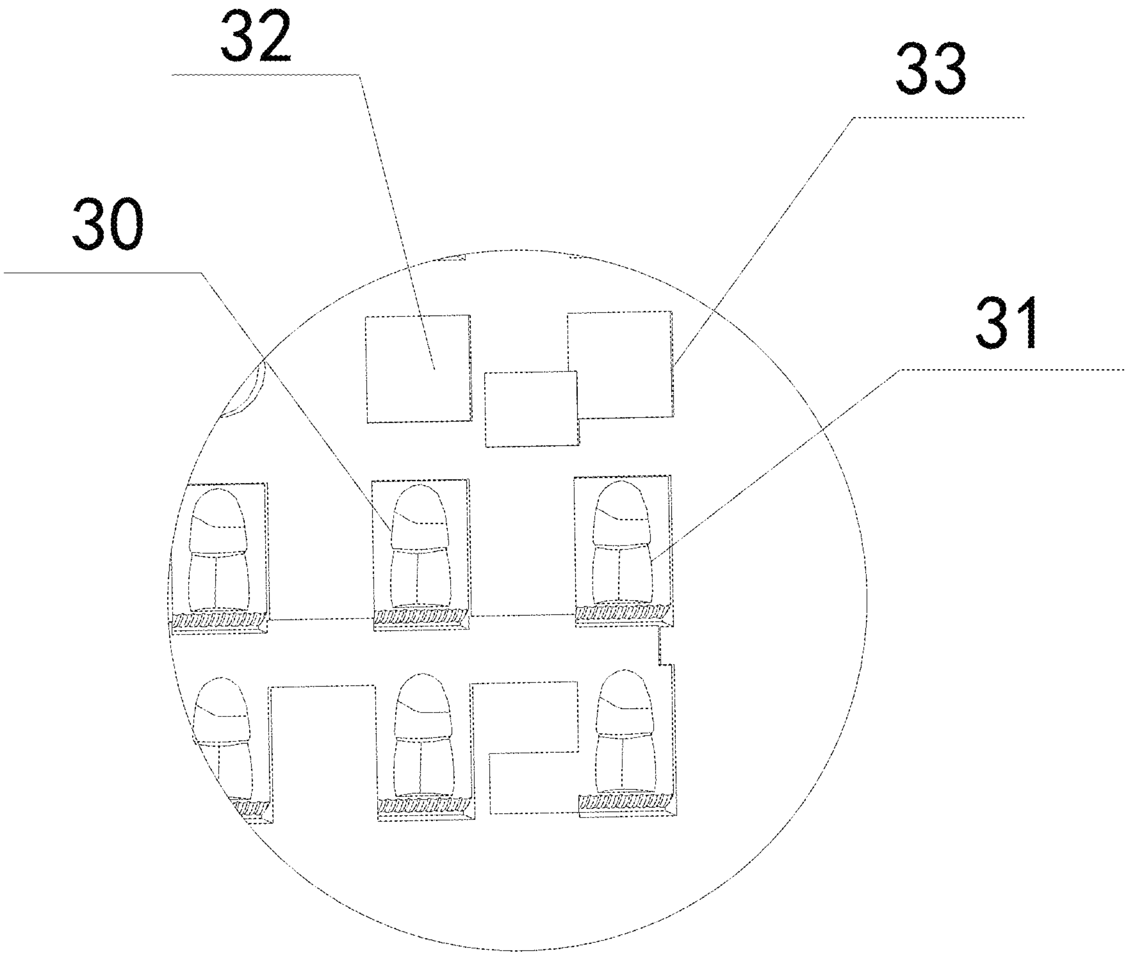
FIG. 10 is an enlarged view of a portion D of FIG. 9.

Referring to FIG. 5 and FIG. 6, the mounting bracket 10 includes a first support 11 and a second support 12 rotatably connected to the first support 11. The second support 12 can rotate 180 degrees relative to the first support 11. The first support 11 is configured to be fixed to a fixing object, such as the ground. The second support 12 is connected to the power supply mounting portion 6 and is provided with a circular gear groove 13. An inner wall of the gear groove 13 is provided with teeth 14. The LED lamp further includes a driving motor 15 mounted on the first support 11. One end of the driving motor 15 is configured to be connected to an external power supply to enable the driving motor 15 to work, and the other end of the driving motor 15 is provided with a motor shaft. The motor shaft is provided with a gear 16 engaged with the teeth 14.

When an angle of the LED lamp needs to be adjusted, the driving motor 15 drives the gear 16 to rotate along the teeth 14, so as to drive the second support 12 to rotate, thereby adjusting the angle of the entire LED lamp.

Figure 3:
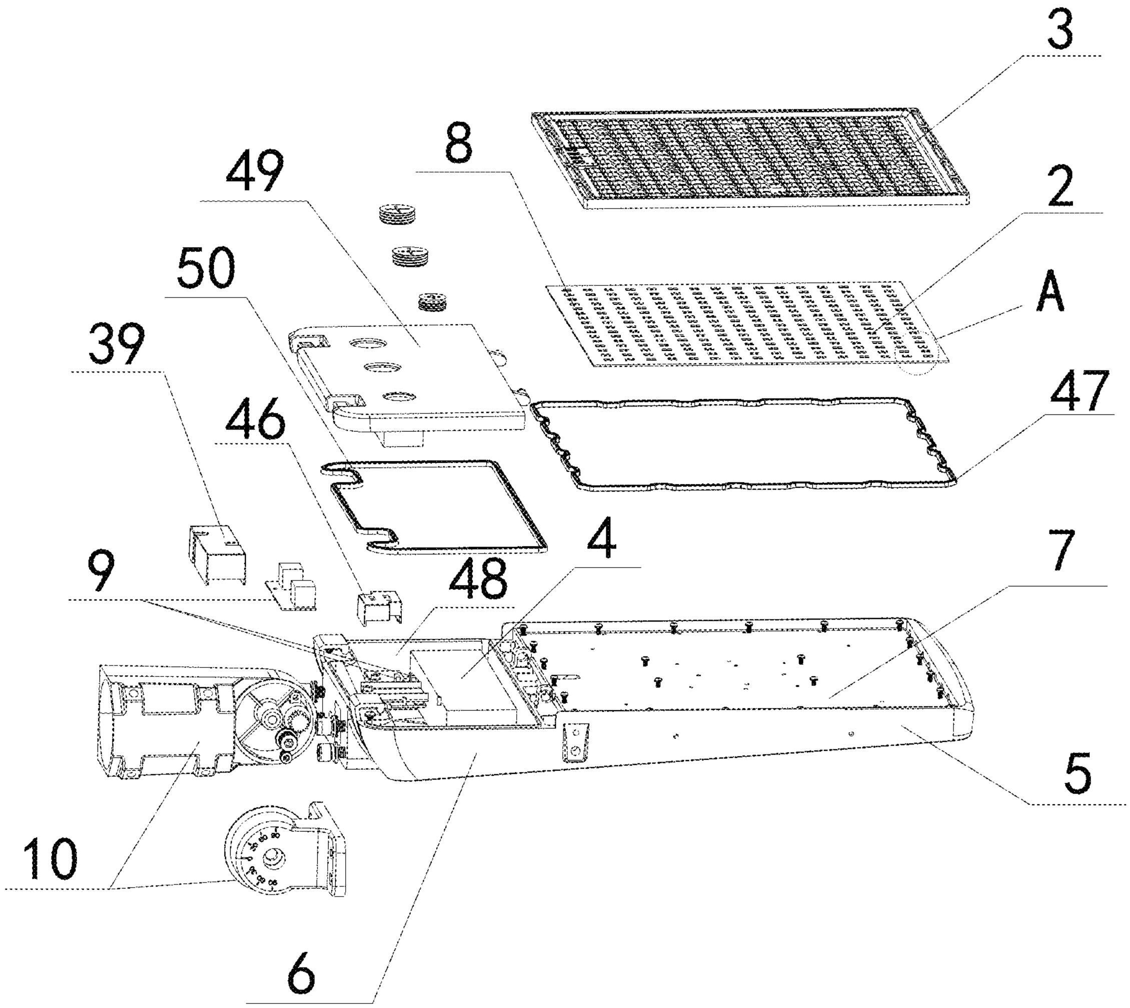
FIG. 3 is an exploded view of the LED lamp of FIG. 1.
Figure 4:
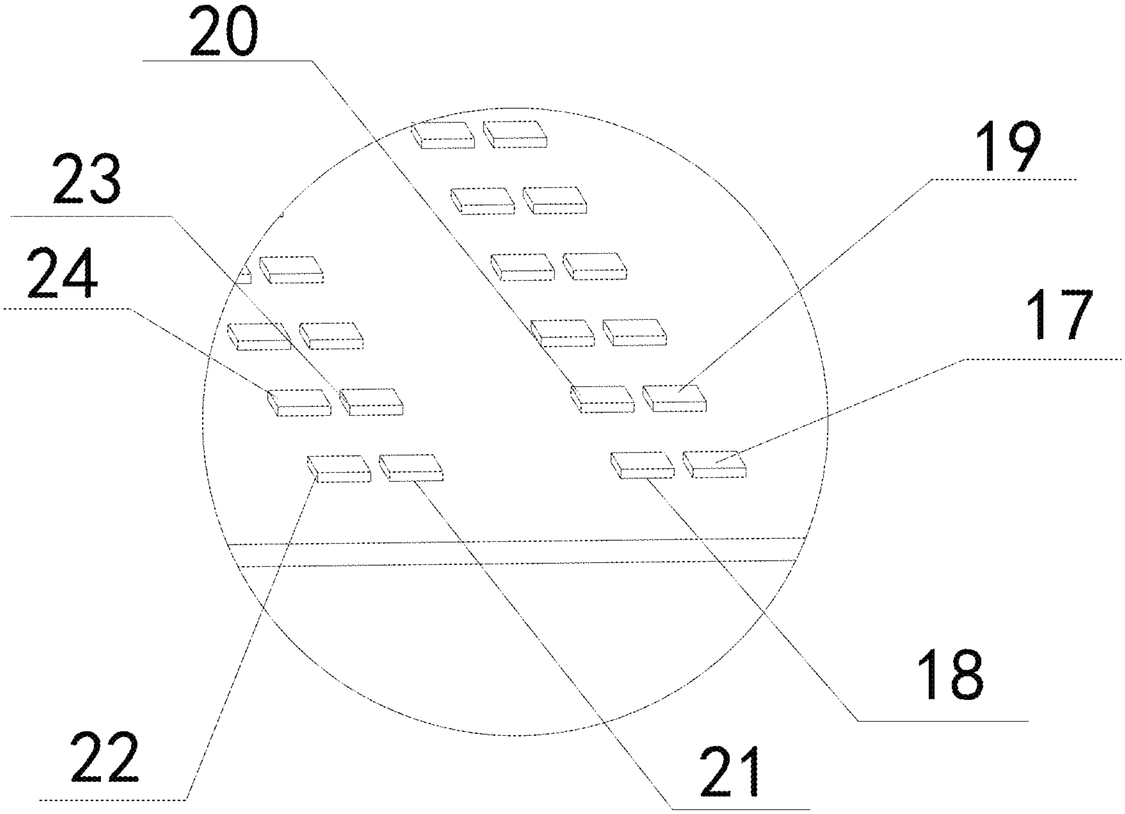
FIG. 4 is an enlarged view of a portion A of FIG. 3.

Referring to FIGS. 3 and 4, the plurality of light emitting elements 8 includes at least two groups of light emitting elements 8 arranged in a matrix. Each group of the light emitting elements 8 includes a first lamp bead 17, a second lamp bead 18, a third lamp bead 19, a fourth lamp bead 20, a fifth lamp bead 21, a sixth lamp bead 22, a seventh lamp bead 23, and an eighth lamp bead 24. A distance between the first lamp bead 17 and the second lamp bead 18, a distance between the third lamp bead 19 and the fourth lamp bead 20, a distance between the fifth lamp bead 21 and the sixth lamp bead 22, and a distance between the seventh lamp bead 23 and the eighth lamp bead 24 each ranges from 0.8 mm to 1.2 mm, which can make the LED lamp achieve a better good emitting effect.

Referring to FIGS. 7 to 10, the lens plate 3 includes a lens frame 25 and a plurality of lenses protruding from the lens frame 25. The plurality of lenses correspond to the plurality of light emitting elements 8 and are convex in a direction away from the light emitting elements 8. The plurality of lenses includes a first lens portion 26, a second lens portion 27, a third lens portion 28, and a fourth lens portion 29. Convex surfaces of the first lens portion 26 and the second lens portion 27 are substantially elliptical arc surfaces, and convex surfaces of the third lens portion 28 and the fourth lens portion 29 are substantially circular arc surfaces, and a size of each the first lens portion 26 and the second lens portion 27 is larger than a size of each the third lens portion 28 and the fourth lens portion 29.

The lens frame 25 is provided with a plurality of receiving holes corresponding to the plurality of lenses. The light emitting elements 8 are received in the receiving holes and face the lenses. Specifically, the receiving holes include a first receiving hole 30, a second receiving hole 31, a third receiving hole 32, and a fourth receiving hole 33 that correspond to the first lens portion 26, the second lens portion 27, the third lens portion 28, and the fourth lens portion 29, respectively. The first receiving hole 30 and the second receiving hole 31 are substantially elliptical, and the third receiving hole 32 and the fourth receiving hole 33 are substantially square. The first lamp bead 17 and the second lamp bead 18 are received in the first receiving hole 30, that is, located on a side of the first lens portion 26 adjacent to the lamp panel 2. The third lamp bead 19 and the fourth lamp bead 20 are received in the second receiving hole 31, that is, located on a side of the second lens portion 27 adjacent to the lamp panel 2. The fifth lamp bead 21 and the sixth lamp bead 22 are received in the third receiving hole 32, that is, located on a side of the third lens portion 28 adjacent to the lamp panel 2. The seventh lamp bead 23 and the eighth lamp bead 24 are received in the fourth receiving hole 33, that is, located on a side of the fourth lens portion 29 adjacent to the lamp panel 2.

The controlling device 9 includes a light emitting angle controller configured to control the light emitting elements 8 corresponding to different positions of the lens plate 3 to emit light.

Figure 11:
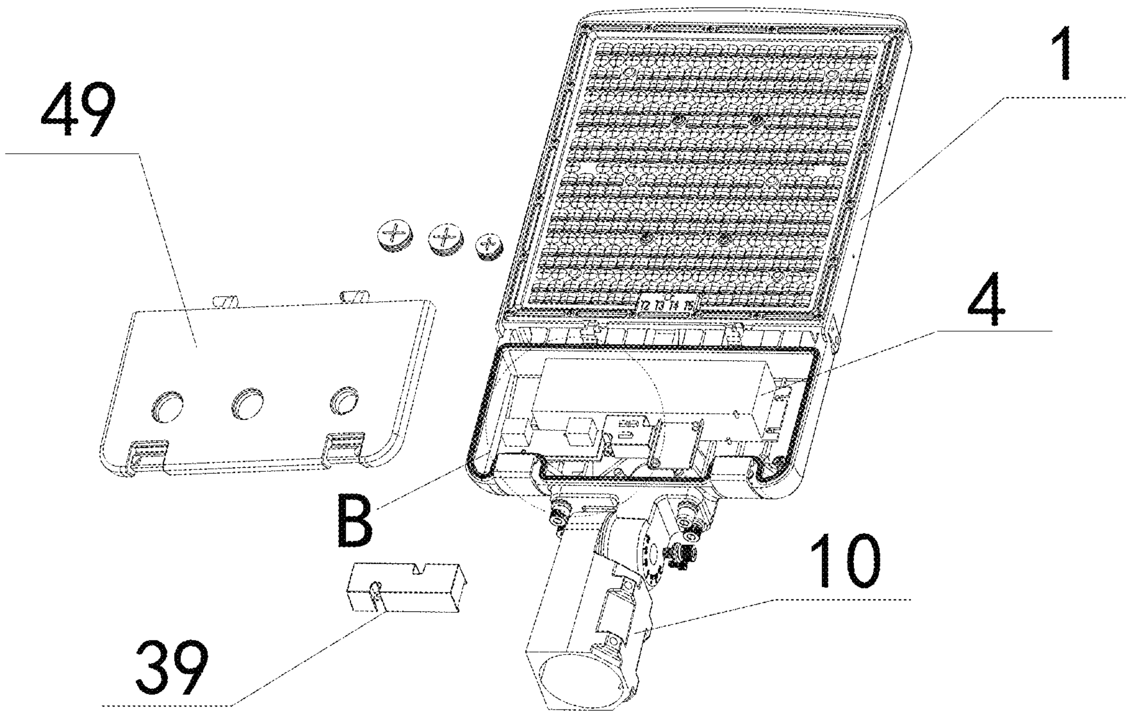
FIG. 11 is another exploded view of the LED lamp of FIG. 1.
Figure 12:
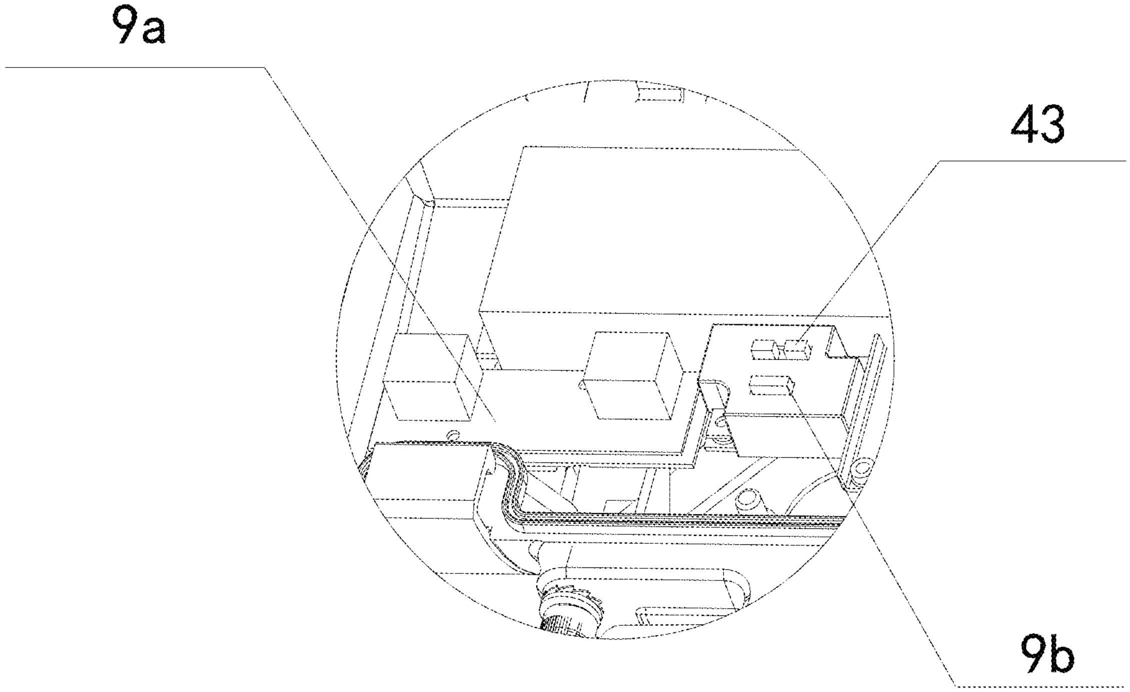
FIG. 12 is an enlarged view of a portion B of FIG. 11.
Figure 13:
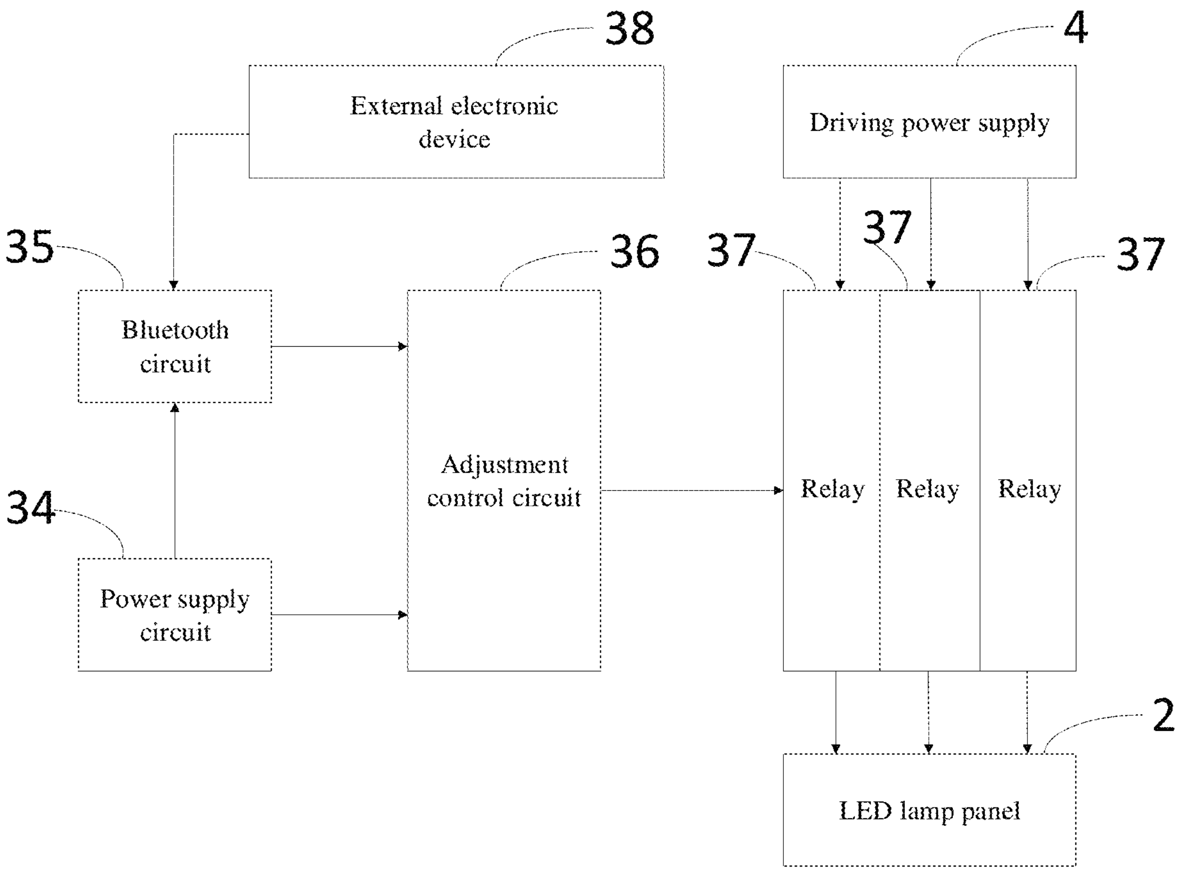
FIG. 13 is a block diagram of the LED lamp of FIG. 1.

In an embodiment, referring to FIGS. 11 to 13, the light emitting angle controller includes a first angle controller 9*a*, which includes a power supply circuit 34, a Bluetooth circuit 35, an adjustment control circuit 36, and a plurality of relays 37. The power supply circuit 34 is electrically connected to the Bluetooth circuit 35 and the adjustment control circuit 36 to supply power to the Bluetooth circuit 35 and the adjustment control circuit 36.

The Bluetooth circuit 35 is configured to be electrically connected to an external electronic device 38 having a Bluetooth function, such that the Bluetooth circuit 35 can receive a light emitting angle control signal sent by the external electronic device 38, and the Bluetooth circuit 35 can transmit the light emitting angle control signal to the adjustment control circuit 36. Specifically, the external electronic device 38 may be a smartphone, and an application program capable of controlling the LED lamp is installed on the smartphone. The user can select different light emitting angle requirements by operating the application program on a screen of the smartphone to generate different light emitting angle control signals. The external electronic device 38 can alternatively be a remote controller, and the remote controller generates different light emitting angle control signals in response to the user's operation on buttons corresponding to different light emitting angles on the remote controller.

The plurality of relays 37 are electrically connected to the driving power supply 4 and the LED lamp panel 2. The adjustment control circuit 36 is configured to control the corresponding relay 37 to turn on or off according to different light emitting angle control signals to control the driving power supply 4 to supply power to different light emitting elements 8, so as to control the first lamp bead 17, the second lamp bead 18, the third lamp bead 19, the fourth lamp bead 20, the fifth lamp bead 21, the sixth lamp bead 22, the seventh lamp bead 23, and the eighth lamp bead 24 of the LED lamp panel 2 to emit light.

In response to receiving a first light emitting angle control signal by the Bluetooth circuit 35, the first lamp bead 17 and the third lamp bead 19 emit light, and the second lamp bead 18, the fourth lamp bead 20, the fifth lamp bead 21, the sixth lamp bead 22, the seventh lamp bead 23, and the eighth lamp bead 24 do not emit light.

In response to receiving a second light emitting angle control signal by the Bluetooth circuit 35, the first lamp bead 17, the second lamp bead 18, the third lamp bead 19, and the fourth lamp bead 20 emit light, and the fifth lamp bead 21, the sixth lamp bead 22, the seventh lamp bead 23, and the eighth lamp bead 24 do not emit light.

In response to receiving a third light emitting angle control signal by the Bluetooth circuit 35, the second lamp bead 18 and the fourth lamp bead 20 emit light, and the first lamp bead 17, the third lamp bead 19, the fifth lamp bead 21, the sixth lamp bead 22, the seventh lamp bead 23, and the eighth lamp bead 24 do not emit light.

In response to receiving a fourth light emitting angle control signal by the Bluetooth circuit 35, the fifth lamp bead 21, the sixth lamp bead 22, the seventh lamp bead 23, and the eighth lamp bead 24 emit light, and the first lamp bead 17, the second lamp bead 18, the third lamp bead 19, and the fourth lamp bead 20 do not emit light.

In this way, the user only needs to select the required light emitting angle of the LED lamp through the external electronic device 38, and the LED lamp can automatically control the lamp beads at different positions to emit light, so as to adjust the light emitting angle of the LED lamp to achieve the required light emitting effect.

Referring to FIG. 11 and FIG. 12, the controlling device 9 further includes a housing 39, and the housing 39 covers the first angle controller 9*a* to protect the first angle controller 9*a*.

Figure 14:
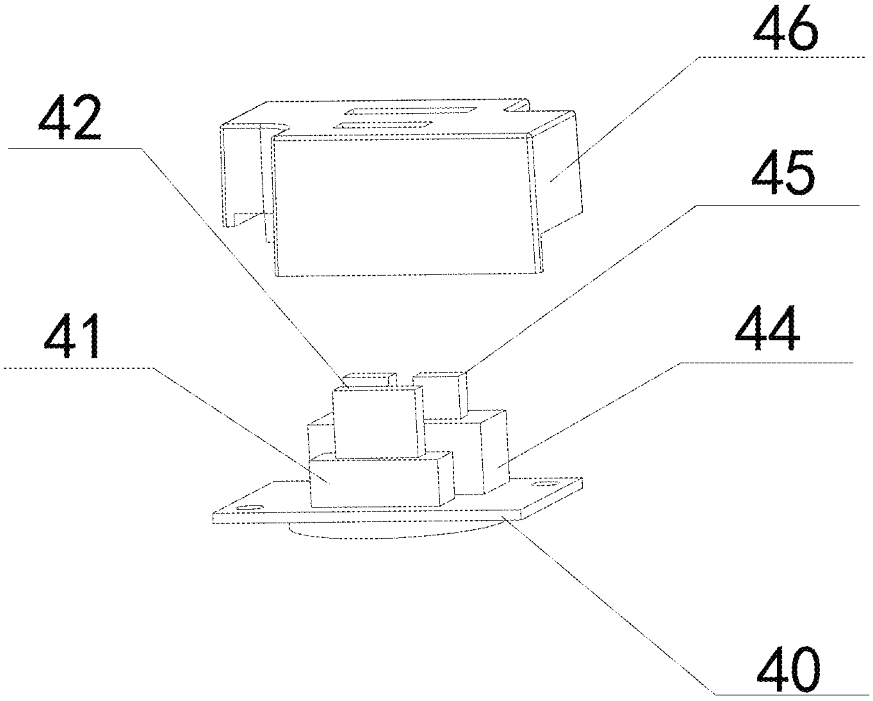
FIG. 14 is an exploded view of a portion of a controlling device in FIG. 11.

In another embodiment, referring to FIGS. 11, 12 and 14, the light emitting angle controller includes a second angle controller 9*b*, which includes a switch base 40, a first electronic switch 41, and a first toggle 42. The switch base 40 is fixed to the power supply mounting portion 6. The first electronic switch 41 is fixedly mounted on the switch base 40. Both ends of the first electronic switch 41 are electrically connected to the driving power supply 4 and the LED lamp panel 2, respectively. The first toggle 42 is connected to the first electronic switch 41 and is configured to be toggled to change a state of the first electronic switch 41. The first electronic switch 41 is configured to control the first lamp bead 17, the second lamp bead 18, the third lamp bead 19, the fourth lamp bead 20, the fifth lamp bead 21, the sixth lamp bead 22, the seventh lamp bead 23, and the eighth lamp bead 24 to emit light according to different states thereof.

In response to the first electronic switch 41 being a first state, the first lamp bead 17 and the third lamp bead 19 emit light, and the second lamp bead 18, the fourth lamp bead 20, the fifth lamp bead 21, the sixth lamp bead 22, the seventh lamp bead 23, and the eighth lamp bead 24 do not emit light.

In response to the first electronic switch 41 being a second state, the first lamp bead 17, the second lamp bead 18, the third lamp bead 19, and the fourth lamp bead 20 emit light, and the fifth lamp bead 21, the sixth lamp bead 22, the seventh lamp bead 23, and the eighth lamp bead 24 do not emit light.

In response to the first electronic switch 41 being a third state, the second lamp bead 18 and the fourth lamp bead 20 emit light, and the first lamp bead 17, the third lamp bead 19, the fifth lamp bead 21, the sixth lamp bead 22, the seventh lamp bead 23, and the eighth lamp bead 24 do not emit light.

In response to the first electronic switch 41 being a fourth state, the fifth lamp bead 21, the sixth lamp bead 22, the seventh lamp bead 23, and the eighth lamp bead 24 emit light, and the first lamp bead 17, the second lamp bead 18, the third lamp bead 19, and the fourth lamp bead 20 do not emit light.

In this way, the light emitting angle of the LED lamp can be adjusted to obtain the desired required light emitting effect only by operating the first toggle 42 of the second angle controller 9*b* to adjust the light emitting state of the eight lamp beads.

In still another embodiment, the light emitting angle controller includes the first angle controller 9*a* and the second angle controller 9*b*. In this case, in the absence of a corresponding external electronic device 38, the light emitting angle of the LED lamp can be adjusted by the second angle controller 9*b*. In a case of a failure of the second angle controller 9*b*, the light emitting angle of the LED lamp can be adjusted by the corresponding external electronic device 38.

Referring to FIGS. 12 and 14, the controlling device 9 further includes a color temperature controller 43 configured to adjust the brightness of the light emitting elements 8. Specifically, the color temperature controller 43 includes the switch base 40, a second electronic switch 44, and a second toggle 45. The second electronic switch 44 is fixedly mounted on the switch base 40, and both ends of the second electronic switch 44 are electrically connected to the driving power supply 4 and the LED lamp panel 2, respectively. The second toggle 45 is connected to the second electronic switch 44 and is configured to be toggled to change a state of the second electronic switch 44. The second electronic switch 44 is configured to control the brightness of the first lamp bead 17, the second lamp bead 18, the third lamp bead 19, the fourth lamp bead 20, the fifth lamp bead 21, the sixth lamp bead 22, the seventh lamp bead 23, and the eighth lamp bead 24 according to different states thereof.

Specifically, when the color temperature needs to be adjusted, the second toggle 45 of the color temperature controller 43 can be toggled to change the state of the second electronic switch 44, and the second electronic switch 44 controls currents of the light emitting elements 8 according to different states thereof to control the brightness of the first lamp bead 17, the second lamp bead 18, the third lamp bead 19, the fourth lamp bead 20, the fifth lamp bead 21, the sixth lamp bead 22, the seventh lamp bead 23, and the eighth lamp bead 24, thereby adjusting the color temperature.

For example, when the first lamp bead 17 and the third lamp bead 19 emits light and the second lamp bead 18, the fourth lamp bead 20, the fifth lamp bead 21, the sixth lamp bead 22, the seventh lamp bead 23, and the eighth lamp bead 24 do not emit light, and the color temperature value needs to be 3000K, the second toggle 45 is toggled to change the second electronic switch 44 in a first state to control currents of the first lamp bead 17 and the third lamp bead 19, so that the color temperature value of the first lamp bead 17 is 2700K and the color temperature value of the third lamp bead 19 is 5700K, which make the color temperature value of the LED lamp to be 3000K.

When the first lamp bead 17 and the third lamp bead 19 emits light and the second lamp bead 18, the fourth lamp bead 20, the fifth lamp bead 21, the sixth lamp bead 22, the seventh lamp bead 23, and the eighth lamp bead 24 do not emit light, and the color temperature value needs to be 4000K, the second toggle 45 is toggled to change the second electronic switch 44 in a second state to control currents of the first lamp bead 17 and the third lamp bead 19, so that the color temperature value of the first lamp bead 17 is 3000K and the color temperature value of the third lamp bead 19 is 5000K, which make the color temperature value of the LED lamp to be 4000K.

When the first lamp bead 17 and the third lamp bead 19 emits light and the second lamp bead 18, the fourth lamp bead 20, the fifth lamp bead 21, the sixth lamp bead 22, the seventh lamp bead 23, and the eighth lamp bead 24 do not emit light, and the color temperature value needs to be 5000K, the second toggle 45 is toggled to change the second electronic switch 44 in a third state to control currents of the first lamp bead 17 and the third lamp bead 19, so that the color temperature value of the first lamp bead 17 is 5000K and the color temperature value of the third lamp bead 19 is 5000K, which make the color temperature value of the LED lamp to be 5000K.

When the first lamp bead 17, the second lamp bead 18, the third lamp bead 19 and the fourth lamp bead 20 emits light and the fifth lamp bead 21, the sixth lamp bead 22, the seventh lamp bead 23, and the eighth lamp bead 24 do not emit light, and the color temperature value needs to be 3000K, the second toggle 45 is toggled to change the second electronic switch 44 in a fourth state to control currents of first lamp bead 17, the second lamp bead 18, the third lamp bead 19 and the fourth lamp bead 20, so that the color temperature value of the first lamp bead 17 and the color temperature value of the second lamp bead 18 are 2700K and the color temperature value of the third lamp bead 19 and color temperature value of the fourth lamp bead 20 is 5700K, which make the color temperature value of the LED lamp to be 3000K.

When the first lamp bead 17, the second lamp bead 18, the third lamp bead 19 and the fourth lamp bead 20 emits light and the fifth lamp bead 21, the sixth lamp bead 22, the seventh lamp bead 23, and the eighth lamp bead 24 do not emit light, and the color temperature value needs to be 4000K, the second toggle 45 is toggled to change the second electronic switch 44 in a fifth state to control currents of first lamp bead 17, the second lamp bead 18, the third lamp bead 19 and the fourth lamp bead 20, so that the color temperature value of the first lamp bead 17 and the color temperature value of the second lamp bead 18 are 3000K and the color temperature value of the third lamp bead 19 and color temperature value of the fourth lamp bead 20 is 5000K, which make the color temperature value of the LED lamp to be 4000K.

When the first lamp bead 17, the second lamp bead 18, the third lamp bead 19 and the fourth lamp bead 20 emits light and the fifth lamp bead 21, the sixth lamp bead 22, the seventh lamp bead 23, and the eighth lamp bead 24 do not emit light, and the color temperature value needs to be 5000K, the second toggle 45 is toggled to change the second electronic switch 44 in a sixth state to control currents of first lamp bead 17, the second lamp bead 18, the third lamp bead 19 and the fourth lamp bead 20, so that the color temperature value of the first lamp bead 17 and the color temperature value of the second lamp bead 18 are 5000K and the color temperature value of the third lamp bead 19 and color temperature value of the fourth lamp bead 20 is 5000K, which make the color temperature value of the LED lamp to be 5000K.

When the second lamp bead 18 and the fourth lamp bead 20 emits light and the first lamp bead 17, the third lamp bead 19, the fifth lamp bead 21, the sixth lamp bead 22, the seventh lamp bead 23, and the eighth lamp bead 24 do not emit light, and the color temperature value needs to be 3000K, the second toggle 45 is toggled to change the second electronic switch 44 in a seventh state to control currents of the second lamp bead 18 and the fourth lamp bead 20, so that the color temperature value of the second lamp bead 18 is 2700K and the color temperature value of the fourth lamp bead 20 is 5700K, which make the color temperature value of the LED lamp to be 3000K.

When the second lamp bead 18 and the fourth lamp bead 20 emits light and the first lamp bead 17, the third lamp bead 19, the fifth lamp bead 21, the sixth lamp bead 22, the seventh lamp bead 23, and the eighth lamp bead 24 do not emit light, and the color temperature value needs to be 4000K, the second toggle 45 is toggled to change the second electronic switch 44 in a eighth state to control currents of the second lamp bead 18 and the fourth lamp bead 20, so that the color temperature value of the second lamp bead 18 is 3000K and the color temperature value of the fourth lamp bead 20 is 5000K, which make the color temperature value of the LED lamp to be 4000K.

When the second lamp bead 18 and the fourth lamp bead 20 emits light and the first lamp bead 17, the third lamp bead 19, the fifth lamp bead 21, the sixth lamp bead 22, the seventh lamp bead 23, and the eighth lamp bead 24 do not emit light, and the color temperature value needs to be 5000K, the second toggle 45 is toggled to change the second electronic switch 44 in a ninth state to control currents of the second lamp bead 18 and the fourth lamp bead 20, so that the color temperature value of the second lamp bead 18 is 5000K and the color temperature value of the fourth lamp bead 20 is 5000K, which make the color temperature value of the LED lamp to be 5000K.

When the fifth lamp bead 21, the sixth lamp bead 22, the seventh lamp bead 23 and the eighth lamp bead 24 emit light and the first lamp bead 17, the second lamp bead 18, the third lamp bead 19, and the fourth lamp bead 20 do not emit light, and the color temperature value needs to be 3000K, the second toggle 45 is toggled to change the second electronic switch 44 in a tenth state to control currents of the fifth lamp bead 21, the sixth lamp bead 22, the seventh lamp bead 23 and the eighth lamp bead 24, so that the color temperature value of the fifth lamp bead 21 and the color temperature value of the sixth lamp bead 22 are 2700K and the color temperature value of the seventh lamp bead 23 and the color temperature value of the eighth lamp bead 24 are 5700K, which make the color temperature value of the LED lamp to be 3000K.

When the fifth lamp bead 21, the sixth lamp bead 22, the seventh lamp bead 23 and the eighth lamp bead 24 emit light and the first lamp bead 17, the second lamp bead 18, the third lamp bead 19, and the fourth lamp bead 20 do not emit light, and the color temperature value needs to be 4000K, the second toggle 45 is toggled to change the second electronic switch 44 in an eleventh state to control currents of the fifth lamp bead 21, the sixth lamp bead 22, the seventh lamp bead 23 and the eighth lamp bead 24, so that the color temperature value of the fifth lamp bead 21 and the color temperature value of the sixth lamp bead 22 are 3000K and the color temperature value of the seventh lamp bead 23 and the color temperature value of the eighth lamp bead 24 are 5000K, which make the color temperature value of the LED lamp to be 4000K.

When the fifth lamp bead 21, the sixth lamp bead 22, the seventh lamp bead 23 and the eighth lamp bead 24 emit light and the first lamp bead 17, the second lamp bead 18, the third lamp bead 19, and the fourth lamp bead 20 do not emit light, and the color temperature value needs to be 5000K, the second toggle 45 is toggled to change the second electronic switch 44 in a twelfth state to control currents of the fifth lamp bead 21, the sixth lamp bead 22, the seventh lamp bead 23 and the eighth lamp bead 24, so that the color temperature value of the fifth lamp bead 21 and the color temperature value of the sixth lamp bead 22 are 5000K and the color temperature value of the seventh lamp bead 23 and the color temperature value of the eighth lamp bead 24 are 5000K, which make the color temperature value of the LED lamp to be 5000K.

In this way, the color temperature of the LED lamp can be adjusted by operating the second toggle 45 to control the current of the light emitting elements 8 through the second electronic switch 44 to control the brightness of the eight lamp beads.

Referring to FIG. 14, the controlling device 9 further includes a switch box 46. The switch box 46 covers the second angle controller 9*b* and the color temperature controller 43, so as to protect the second angle controller 9*b* and the color temperature controller 43, and provide a good dust-proof effect for the second angle controller 9*b* and color temperature controller 43.

Referring to FIG. 3, the LED lamp further includes a first sealing ring 47 provided between the lens plate 3 and the LED lamp panel 2, so that the LED lamp panel 2 has a good waterproof effect.

The power supply mounting portion 6 includes a power supply accommodating chamber 48 and a power supply cover 49. The driving power supply 4 is mounted in the power supply accommodating chamber 48. The power supply cover 49 covers the power supply accommodating chamber 48. One end of the power supply cover 49 is hinged to the heat dissipation base 1, and the other end of the power supply cover 49 is detachably connected to the heat dissipation base 1 by screws.

The LED lamp further includes a second sealing ring 50 provided between the power supply mounting portion 6 and the power supply cover 49, so that the power supply mounting portion 6 has a good waterproof effect.

According to the LED lamp, when the light emitting angle of the LED lamp needs to be adjusted, the user only needs to select the required light emitting angle through the external electronic device 38 to control the light emitting elements 8 at different positions to emit light, or only needs to operate the second angle controller 9*b* to control the light emitting elements 8 at different positions to emit light. When the color temperature is required to be adjusted, only the color temperature controller 43 needs to be operate to adjust the brightness of the light-emitting elements 8. The lens plate 3 does not need to be replaced when the light emitting angle and the color temperature are adjusted, which saves the cost of replacing the lens plate 3, is more intelligent and humanized, and is safer and more reliable.

The above-mentioned embodiments do not constitute a limitation on the protection scope of the technical solution. Any modifications, equivalent replacements and improvements made within the spirit and principles of the above-mentioned embodiments shall be included within the protection scope of this technical solution.

The foregoing descriptions are merely specific embodiments of the present disclosure, but are not intended to limit the protection scope of the present disclosure. Any variation or replacement readily figured out by a person skilled in the art within the technical scope disclosed in the present disclosure shall all fall within the protection scope of the present disclosure.

What is claimed is:

1. An LED lamp, comprising:

a heat dissipation base comprising a lamp panel mounting portion and a power supply mounting portion connected to an end of the lamp panel mounting portion, the lamp panel mounting portion being provided with a mounting groove;

an LED lamp panel fixedly mounted in the mounting groove and comprising a plurality of light emitting elements;

a driving power supply mounted to the power supply mounting portion;

a lens plate covering the LED lamp panel;

a mounting bracket connected to the power supply mounting portion and configured to drive the power supply mounting portion to rotate; and a controlling device provided on the power supply mounting portion and electrically connected between the LED lamp panel and the driving power supply, wherein the controlling device is configured to control each light emitting element corresponding to different positions of the lens plate to emit light and adjust brightness of each light emitting element corresponding to different positions of the lens plate;

wherein the mounting bracket comprises a first support and a second support, the first support is configured to be fixed to a fixing object, the second support is connected to the power supply mounting portion and is provided with a circular gear groove, an inner wall of the gear groove is provided with teeth, the LED lamp further comprises a driving motor mounted on the first support, and a motor shaft of the driving motor is provided with a gear engaged with the teeth.

2. The LED lamp according to claim 1, wherein the second support is capable of rotating 180 degrees relative to the first support.

3. The LED lamp according to claim 1, wherein the plurality of light emitting elements comprises at least two groups of light emitting elements arranged in a matrix, each group of the light emitting elements comprises a first lamp bead, a second lamp bead, a third lamp bead, a fourth lamp bead, a fifth lamp bead, a sixth lamp bead, a seventh lamp bead, and an eighth lamp bead; a distance between the first lamp bead and the second lamp bead, a distance between the third lamp bead and the fourth lamp bead, a distance between the fifth lamp bead and the sixth lamp bead, and a distance between the seventh lamp bead and the eighth lamp bead each ranges from 0.8 mm to 1.2 mm.

4. The LED lamp according to claim 3, wherein the controlling device comprises a first angle controller, the first angle controller comprises a power supply circuit, a Bluetooth circuit, an adjustment control circuit, and a plurality of relays, the power supply circuit is electrically connected to the Bluetooth circuit and the adjustment control circuit to supply power to the Bluetooth circuit and the adjustment control circuit, the Bluetooth circuit is configured to receive a light emitting angle control signal sent by an external electronic device and transmit the light emitting angle control signal to the adjustment control circuit, the plurality of relays are electrically connected to the driving power supply and the LED lamp panel, the adjustment control circuit is configured to control the corresponding relay to turn on or off according to different light emitting angle control signals to control the driving power supply to supply power to different light emitting elements, so as to control the first lamp bead, the second lamp bead, the third lamp bead, the fourth lamp bead, the fifth lamp bead, the sixth lamp bead, the seventh lamp bead, and the eighth lamp bead to emit light, respectively.

5. The LED lamp according to claim 4, wherein in response to receiving a first light emitting angle control signal by the Bluetooth circuit, the first lamp bead and the third lamp bead emit light, and the second lamp bead, the fourth lamp bead, the fifth lamp bead, the sixth lamp bead, the seventh lamp bead, and the eighth lamp bead do not emit light;

in response to receiving a second light emitting angle control signal by the Bluetooth circuit, the first lamp bead, the second lamp bead, the third lamp bead, and the fourth lamp bead emit light, and the fifth lamp bead, the sixth lamp bead, the seventh lamp bead, and the eighth lamp bead do not emit light;

in response to receiving a third light emitting angle control signal by the Bluetooth circuit, the second lamp bead and the fourth lamp bead emit light, and the first lamp bead, the third lamp bead, the fifth lamp bead, the sixth lamp bead, the seventh lamp bead, and the eighth lamp bead do not emit light;

in response to receiving a fourth light emitting angle control signal by the Bluetooth circuit, the fifth lamp bead, the sixth lamp bead, the seventh lamp bead, and the eighth lamp bead emit light, and the first lamp bead, the second lamp bead, the third lamp bead, and the fourth lamp bead do not emit light.

6. The LED lamp according to claim 5, wherein the controlling device further comprises a second angle controller, the second angle controller comprises a switch base, a first electronic switch, and a first toggle, the switch base is fixed to the power supply mounting portion, the first electronic switch is fixedly mounted on the switch base, both ends of the first electronic switch are electrically connected to the driving power supply and the LED lamp panel, respectively, the first toggle is connected to the first electronic switch and is configured to be toggled to change a state of the first electronic switch, and the first electronic switch is configured to control the first lamp bead, the second lamp bead, the third lamp bead, the fourth lamp bead, the fifth lamp bead, the sixth lamp bead, the seventh lamp bead, and the eighth lamp bead to emit light according to different states thereof.

7. The LED lamp according to claim 6, wherein in response to the first electronic switch being in a first state, the first lamp bead and the third lamp bead emit light, and the second lamp bead, the fourth lamp bead, the fifth lamp bead, the sixth lamp bead, the seventh lamp bead, and the eighth lamp bead do not emit light;

in response to the first electronic switch being a second state, the first lamp bead, the second lamp bead, the third lamp bead, and the fourth lamp bead emit light, and the fifth lamp bead, the sixth lamp bead, the seventh lamp bead, and the eighth lamp bead do not emit light;

in response to the first electronic switch being a third state, the second lamp bead and the fourth lamp bead emit light, and the first lamp bead, the third lamp bead, the fifth lamp bead, the sixth lamp bead, the seventh lamp bead, and the eighth lamp bead do not emit light;

in response to the first electronic switch being a fourth state, the fifth lamp bead, the sixth lamp bead, the seventh lamp bead, and the eighth lamp bead emit light, and the first lamp bead, the second lamp bead, the third lamp bead, and the fourth lamp bead do not emit light.

8. The LED lamp according to claim 4, wherein the controlling device further comprises a color temperature controller, and the color temperature controller is configured to adjust the brightness of each light emitting element corresponding to different positions of the lens plate.

9. The LED lamp according to claim 8, wherein the color temperature controller comprises the switch base, a second electronic switch, and a second toggle, the second electronic switch is fixedly mounted on the switch base, both ends of the second electronic switch are electrically connected to the driving power supply and the LED lamp panel, respectively, the second toggle is connected to the second electronic switch and is configured to be toggled to change a state of the second electronic switch, and the second electronic switch is configured to control the brightness of the first lamp bead, the second lamp bead, the third lamp bead, the fourth lamp bead, the fifth lamp bead, the sixth lamp bead, the seventh lamp bead, and the eighth lamp bead according to different states thereof.

10. The LED lamp according to claim 1, wherein the lens plate comprises a lens frame and a plurality of lenses protruding from the lens frame, the plurality of lenses correspond to the plurality of light emitting elements and are convex in a direction away from the light emitting elements, the lens frame is provided with a plurality of receiving holes corresponding to the plurality of lenses, the plurality of light emitting elements are received in the plurality of receiving holes and face the plurality of lenses, the plurality of receiving holes comprise a first receiving hole and a second receiving hole that are substantially elliptical, and a third receiving hole and a fourth receiving hole that are substantially square.

11. The LED lamp according to claim 1, further comprising a first sealing ring provided between the lens plate and the LED lamp panel.

12. The LED lamp according to claim 1, wherein the power supply mounting portion comprises a power supply accommodating chamber and a power supply cover, the driving power supply is mounted in the power supply accommodating chamber, the power supply cover covers the power supply accommodating chamber, one end of the power supply cover is hinged to the heat dissipation base, and another end of the power supply cover is detachably connected to the heat dissipation base by screws.

13. The LED lamp according to claim 12, further comprising a second sealing ring and a mounting bracket, wherein the second sealing ring is provided between the power supply mounting portion and the power supply cover.

* * * * *